United States Patent [19]
Greenwald

[11] 3,775,689
[45] Nov. 27, 1973

[54] SIGNAL-TO-NOISE RATIO MEASURING SYSTEM FOR FREQUENCY MODULATED COMMUNICATION SYSTEMS

[75] Inventor: Charles Greenwald, Livingston, N.J.

[73] Assignee: International Telephone and Telegraph Corporation, Nutley, N.J.

[22] Filed: Dec. 18, 1970

[21] Appl. No.: 99,645

Related U.S. Application Data

[63] Continuation-in-part of Ser. No. 751,558, Aug. 9, 1968, abandoned.

[52] U.S. Cl. ............. 325/363, 179/15 BF, 325/364, 325/477

[51] Int. Cl. ............................................ H04b 1/06

[58] Field of Search ................. 179/15 BF; 324/100, 324/113; 325/52, 56, 66, 67, 304–306, 311, 324/334, 345, 363, 364, 371, 377, 379, 380, 430, 477; 330/2

*Primary Examiner*—Albert J. Mayer
*Attorney*—C. Cornell Remsen, Jr. et al.

[57] ABSTRACT

A balanced mixer and crystal oscillator translates a baseband signal upward in frequency just below the passband of a crystal filter at the output of the mixer. The filter passes only the noise in its passband to a logarithmic amplifier-detector. The DC output of the detector is coupled to a recorder calibrated directly in signal-to-noise ratio of the translated baseband signal. Different width baseband signals (different number of FDM channels) are handled by changing the crystal of the oscillator so that the translated baseband signal remains just below the filter passband.

10 Claims, 2 Drawing Figures

SIGNAL-TO-NOISE RATIO MEASURING SYSTEM FOR FREQUENCY MODULATED COMMUNICATION SYSTEMS

CROSS-REFERENCE TO RELATED APPLICATION

This application is a continuation-in-part application of copending application Ser. No. 751,558, filed Aug. 9, 1968 now abandoned.

BACKGROUND OF THE INVENTION

This invention related to systems for measuring characteristics of a signal and more particularly to a signal-to-noise ratio measuring system.

The signal-to-noise improvement ratio for a particular channel of a frequency division multiplex (FDM) communication system is given by the expression $(S/N)_o = (C/N)_i\ (B/Bc)\ (\Delta Fm/fn)^2$, where 2B = IF (intermediate frequency) bandwidth, Bc = channel bandwidth, ΔFm = peak channel frequency deviation and fn = midband channel frequency in the $n^{th}$ channel. From this equation, which is taken from, "Reference Data for Radio Engineers," Fifth Edition, Page 21–12, it is seen that the signal/noise ratio at the baseband output of a frequency modulated (FM) receiver is directly proportional to the radio frequency signal input (C) above threshold. Since Δ Fm, fn, B and Bc are fixed for a given system, a measurement of the noise of the system is essentially a measurement of the signal-to-noise ratio of that system. The measurement of the noise of the system is accomplished by measuring the out-of-band noise and this technique for obtaining a measurement of the signal-to-noise ratio of the system has been employed in tropospheric scatter communications systems since 1955. Such a system is described in C. L. Mack, "Diversity Reception in UHF Long Range Communication," Proc. IRE, Volume 43, dated Oct. 1955, pages 1281–1289. This article points out that in an FM system operating above threshold, the signal level in the passband is a function of the deviation and is invariant with radio frequency signal level. The signal-to-noise ratio of the receiver is, therefore, a function of the noise power alone. To obtain a measure of the signal-to-noise ratio, the modulating signals are rejected by a high pass filter and the remaining noise spectrum above the intelligence is integrated and measured. The resultant measured noise is directly proportional to the signal-to-noise ratio at the baseband output of an FM receiver.

Thus, a technique is present enabling the measurement of signal-to-noise ratio at the baseband output of an FM receiver which does not require the presence of signal and noise but only requires the presence of noise whose amplitude is proportional to the signal-to-noise ratio at the baseband output of the fm receiver.

SUMMARY OF THE INVENTION

An object of this invention is to provide a signal-to-noise ratio measuring system having flexibility to handle various baseband signals of different bandwidth.

A further object of this invention is to provide a signal-to-noise ratio measuring system having relatively low cost and flexibility for various bandwidth baseband signals dictated by the channel capacity of a satellite, tropospheric scatter or line-of-sight communication system.

A feature of this invention is the provision of a signal-to-noise ratio measuring system comprising a source of first signal whose signal-to-noise ratio is to be measured, the first signal including a baseband signal occupying a given band of frequencies and noise both within the given band of frequencies and outside the given band of frequencies; second means having a frequency passband in an intermediate frequency band spaced from the given band of frequencies; and adjustable heterodyne means coupled between source and the second means to translate the baseband signal and the noise to the intermediate frequency band but spaced below the frequency passband so that the second means passes only the noise outside the translated baseband signal band of frequencies in the frequency passband, the heterodyne means enabling the second means to be employed for baseband signals having different bandwidths; third means coupled to the second means responsive to only the noise present in the frequency passband to produce a direct current voltage proportional to the logarithm of the magnitude of the noise in the frequency passband; and fourth means coupled to the third means calibrated in signal-to-noise ratio to indicate the magnitude of the signal-to-noise ratio of the first signal in response to the direct current voltage.

BRIEF DESCRIPTION OF THE DRAWING

The above-mentioned and other features and objects of this invention will become more apparent by reference to the following description taken in conjunction with the accompanying drawing, in which.

DESCRIPTION OF THE PREFERRED EMBODIMENT

Figures 1, 2:
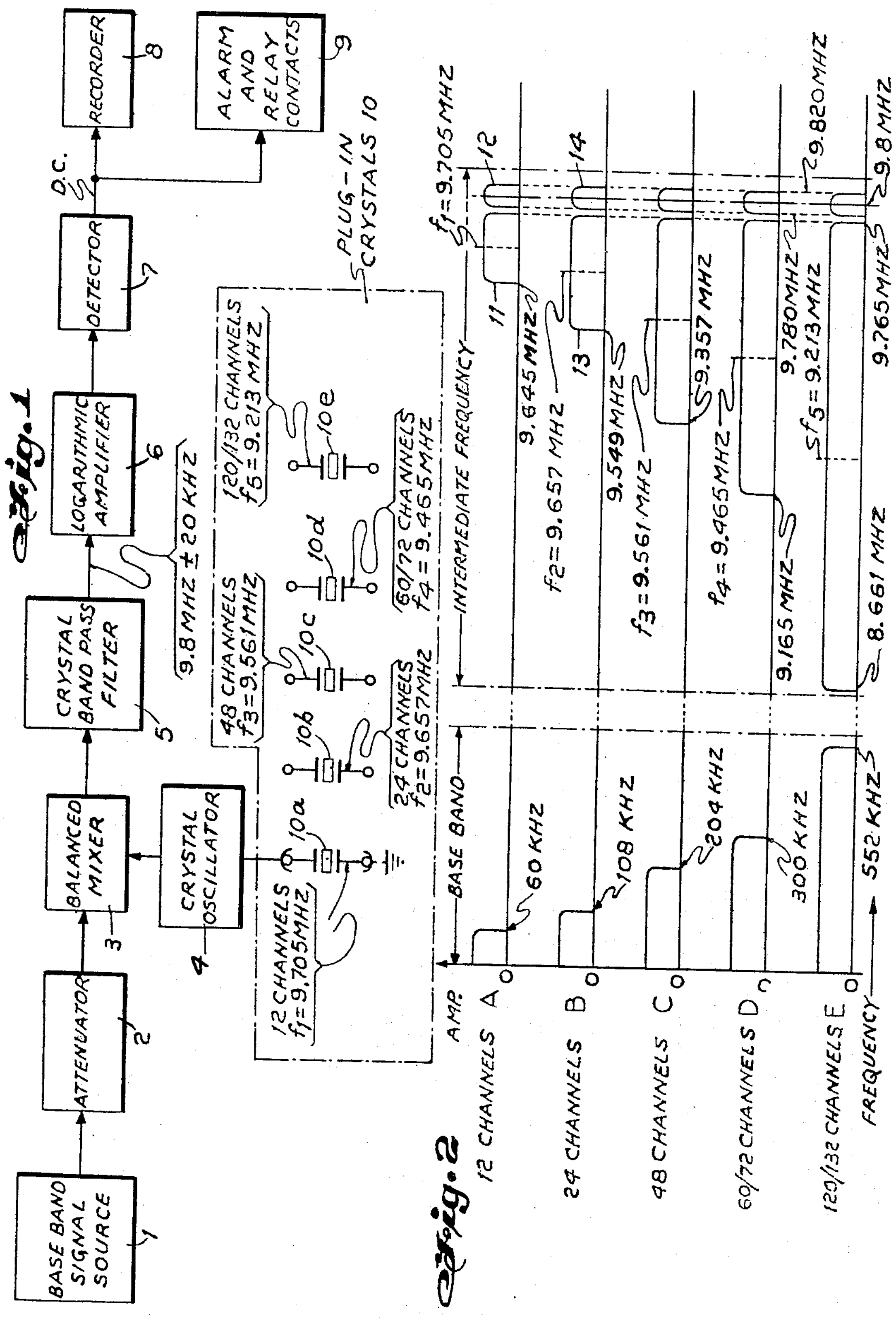
FIG. 1 is a block diagram of the signal-to-noise measuring system in accordance with the principles of this invention.
FIG. 2 includes a series of curves illustrating the operation of the system of FIG. 1 for various bandwidth baseband signals as determined by the channel capacity of an FDM communication system.

Referring to FIG. 1, there is illustrated therein in block diagram form a signal-to-noise ratio measuring the system in accordance with the principles of this invention. The system of this invention is a heterodyne type system. Source 1 provides an input signal including the baseband signal of an FM communication system within a given frequency band together with noise both in the frequency band of the baseband signal and outside this frequency band. Source 1 is coupled by means of variable attenuator 2 to balanced mixer 3. The other input of mixer 3 is provided by an appropriate crystal controlled oscillator 4 to translate the baseband signal into a frequency range just below the 9.8 megahertz (MHZ) band. The output of mixer 3 is coupled to crystal bandpass filter 5 whose operating frequency is centered at 9.8 MHZ and has a bandwidth of 20 KHZ (kilohertz). The output of filter 5 which has a frequency passband just above the translated baseband signal is coupled to logarithmic amplifier 6 and detector 7 to produce a DC voltage which is proportional to the logarithm of the noise present in the frequency passband of filter 5 (the out-of-band noise). This DC voltage is then coupled to a suitable recorder 8 which may be a chart recorder or meter. Also the DC voltage is coupled to an alarm and relay contacts 9 which would be activated to protect the equipment of the communication system when the DC voltage increases above a predetermined threshold, that is, when the noise is excessive.

The frequency of the output of oscillator 4 may be adjusted by employing plug-in crystals 10 to change the frequency output of oscillator 4 so that the translated baseband is just below the frequency passband of filter 5 for various channel capacities of an FDM communication system. As an example, there are illustrated in FIG. 1 five crystals 10*a*–10*e* that may be plugged in the circuit of oscillator 4 having the indicated resonant frequencies for the indicated channel capacities.

It should be recognized that the frequency values set forth hereinabove, illustrated in the drawing and referred to hereinbelow are only for purposes of explanation and can be adjusted appropriately to meet system specification requirements.

Referring to FIG. 2, there is illustrated therein curves illustrating the operation of the system of FIG. 1 for the indicated channel capacities where the appropriate plug-in crystal is employed in conjunction with oscillator 4. For example, refer to Curve A, FIG. 2 which is an example of the operation of the system of FIG. 1 in a 12 channel capacity mode. The baseband signal from source 1 includes frequencies up to 60 KHZ. This is translated to a band centered around frequency $f_1$ = 9.705 MHZ ± 60 KHZ as illustrated by frequency characteristic 11. Crystal 10*a* provides the 9.705 MHZ center frequency $f_1$. Crystal bandpass filter 5 is centered around 9.8 MHZ with a bandwidth of ± 20 KHZ as illustrated by frequency characteristic 12. Thus, the baseband translated signal plus the 9.705 MHZ carrier are rejected by filter 5 and a 20 KHZ out-of-band noise centered around 9.8 MHZ is passed to a 9.8 KHZ logarithmic amplifier 6 and detector 7 resulting in a DC voltage proportional to the logarithm of the out-of-band noise (the value of out-of-band noise expressed in decibels) which is passed on to recorder 8. Since the out-of-band noise is proportional to the in-band channel signal-to-noise as taught in the references cited hereinabove in the section labelled "Background of the Invention," recorder 8 can be calibrated directly in in-band channel signal-to-noise ratio expressed in decibels.

One method of calibrating recorder 8 is to apply a signal of known and adjustable amplitude to the input of filter 5 and adjust the amplitude in steps such that a scale in recorder 8 can be marked with the decibel value of the signal-to-noise ratio corresponding to the known amplitude of the calibrating signal.

For operation in the 24 channel mode reference should be made to Curve B, FIG. 2 wherein plug-in crystal 10*b* having a frequency $f_2$ = 9.657 MHZ is plugged into the circuit of oscillator 4. This adjusts the IF signal to a frequency band of 9.657 MHZ ± 108 KHZ just below the passband 9.8 MHZ ± 20 KHZ of filter 5. This is illustrated by frequency characteristics 13 and 14. Here again the frequency translated baseband signal and the carrier signal 9.657 MHZ is rejected by filter 5 and the 20 KHZ out-of-band noise is measured by means of amplifier 6, detector 7 and recorder 8 as previously explained.

A 48 channel mode operation, a 60/72 channel mode operation and a 120/132 channel mode operation are illustrated by the frequency characteristics of Curves C, D and E, FIG. 2. The operation for these channel capacities are identical with that described with reference to Curves A and B, FIG. 2 upon selection of the proper plug-in crystal 10*c*, 10*d* and 10*e*, respectively, having a different frequency for each of the different channel capacities as indicated in FIG. 1.

While I have described above the principles of my invention in connection with specific apparatus, it is to be clearly understood that this description is made only by way of example and not as a limitation to the scope of my invention as set forth in the objects thereof and in the accompanying claims.

I claim:

1. A signal-to-noise ratio measuring system comprising:
a source of first signal whose signal-to-noise ratio is to be measured, said first signal including a baseband signal occupying a given band of frequencies and noise both within said given band of frequencies and outside said given band of frequencies;
second means having a frequency passband in an intermediate frequency band spaced from said given band of frequencies;
an adjustable heterodyne means coupled between said source and said second means to translate said baseband signal and said noise to said intermediate frequency band but spaced below said frequency passband so that said second means passes only said noise outside said translated baseband signal band of frequencies in said frequency passband, said heterodyne means enabling said second means to be employed for baseband signals having different bandwidths;
third means coupled to said second means responsive to only said noise present in said frequency passband to produce a direct current voltage proportional to the logarithm of the magnitude of said noise in said frequency passband; and
fourth means coupled to said third means calibrated in signal-to-noise ratio to indicate the magnitude of the signal-to-noise ratio of said first signal in response to said direct current voltage.

2. A system according to claim 1, wherein
said second means includes
a bandpass filter means having said passband.

3. A system according to claim 2, wherein
said filter means includes
a crystal bandpass filter having said passband.

4. A system according to claim 1, wherein
said third means includes
a logarithmic amplifier coupled to said second means, and
a detector coupled to said amplifier to produce said direct current voltage.

5. A system according to claim 1, wherein
said second means includes
a crystal bandpass filter having said passband; and
said third means includes
a logarithmic amplifier coupled to said filter, and
a detector coupled to said amplifier to produce said direct current voltage.

6. A system according to claim 1, wherein
said heterodyne means includes
a crystal oscillator, and
a balanced mixer coupled to said source and said oscillator to provide said translated baseband signal and said noise.

7. A system according to claim 6, wherein
said baseband signal includes any one of a plurality different bandwidths, and the crystal of said oscillator is selected to have a resonant frequency determined by each of said plurality of different bandwidths to provide said translated baseband signal and said noise compatible with said frequency passband of said second means.

8. A system according to claim 6, wherein said second means includes
a crystal bandpass filter having said passband.

9. A system according to claim 6, wherein said third means includes
a logarithmic amplifier coupled to said second means, and
a detector coupled to said amplifier to produce said direct current voltage.

10. A system according to claim 6, wherein said second means includes
a crystal bandpass filter having said passband; and said third means includes
a logarithmic amplifier coupled to said filter, and
a detector coupled to said amplifier to produce said direct current voltage.

* * * * *